United States Patent [19]
Heckmann

[11] 4,295,558
[45] Oct. 20, 1981

[54] DEVICE FOR CONVEYING CONTAINERS

[75] Inventor: Werner Heckmann, Dortmund, Fed. Rep. of Germany

[73] Assignee: Holstein und Kappert GmbH, Dortmund, Fed. Rep. of Germany

[21] Appl. No.: 82,626

[22] Filed: Oct. 9, 1979

[30] Foreign Application Priority Data

Dec. 13, 1978 [DE] Fed. Rep. of Germany ....... 2853696

[51] Int. Cl.³ .............................................. B65G 47/22
[52] U.S. Cl. .................................... 198/440; 198/442; 198/481; 209/523
[58] Field of Search ............... 198/442, 441, 440, 436, 198/481, 482, 598, 599, 636, 637, 367, 368, 608, 437; 209/555, 558, 523, 524

[56] References Cited
U.S. PATENT DOCUMENTS

| | | | |
|---|---|---|---|
| 1,898,662 | 2/1933 | Herold et al. ........................ | 198/442 |
| 2,827,998 | 3/1958 | Breeback ............................ | 198/441 |
| 4,125,184 | 11/1978 | Seragnoli ........................... | 198/442 |

Primary Examiner—Robert B. Reeves
Assistant Examiner—Douglas D. Watts
Attorney, Agent, or Firm—Toren, McGeady & Stanger

[57] ABSTRACT

A container conveying device includes two conveyor wheels mounted for rotational movement for conveying containers along either one of a main path of movement for containers to be used later, or a shunt path of movement for containers to be removed and inspected or discarded. A pair of tongue members are mounted for pivotal movement in the vicinity of both of the wheels, one of the members conforming to the contours of the containers to engage and confine containers moving along either one of the paths. The other tongue member is adapted to engage and confine containers moving along at least the main path of movement.

1 Claim, 2 Drawing Figures

DEVICE FOR CONVEYING CONTAINERS

BACKGROUND OF THE INVENTION

The present invention relates generally to devices for conveying containers or bottles by way of at least two wheels having circular recesses arranged in their outer peripheries for receiving the containers, and more particularly to a container conveying device wherein an additional conveyor mechanism is provided to remove containers which are to be inspected or discarded after being conveyed by the wheels.

Container or bottle feeder devices are known including sorting machines which have the specific function of transferring reusable foodstuff containers, which are not flawlessly cleansed, to a shunt conveyor track for recleansing and inspection. The conveyor wheels of such a device cooperate to provide a main path of movement for the containers. As soon as a container, identified as being defective, is to be removed, it is secured by clamping devices associated with one of the conveyor wheels, and carried over a shunt path of container movement. This path of movement is arranged to convey the defective container to a cleansing machine. The region between the conveyor wheels themselves and between the conveyor wheels and the shunt conveyor track whereat the containers are transferred provides considerable difficulties because of differently applied centrifugal forces acting on the containers within these regions. For example, beverage bottles may break and produce considerable downtime in a bottling plant because of bottle fragments or chips becoming jammed in the machinery, or the like.

An object of the present invention is to overcome the above and other drawbacks in the prior art container conveying devices.

Another object of the present invention is to provide a container conveying device wherein the containers are anchored or otherwise confined to resist centrifugal forces during their passage in the vicinity of conveyor wheels whereat they undergo curvilinear movement, regardless of the direction of their movement, and to support the containers so that they are safely guided through their paths of movement.

In accordance with the present invention, a device for conveying containers comprises at least two conveyor wheels mounted for rotational movement and having circular recesses in their circumferential peripheries for receiving and conveying containers when the wheels are rotated. The wheels are arranged to convey containers over either a main path of movement or a shunt path of movement. A pair of tongue members are pivotally mounted in the vicinity of the wheels, one of the tongue members has a surface conforming with the contour of the containers to engage and confine containers, moving along either of the main or shunt paths, to the recesses, the other tongue member being arranged to engage and confine containers, moving along at least the main path of movement, to the recesses.

In a preferred embodiment, both of the tongue members are arranged on a common shaft, and are urged toward their disengaged positions by spring bias means.

The device of the present invention overcomes the above-mentioned problems. For containers to be transported through the main path of movement, both of the tongue members restrict the containers to this path. One of the members is also arranged to limit movement of containers to be removed within the shunt path of movement. Accordingly, a trouble free transfer of the containers is effected in both path directions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE INVENTION

Figure 1:
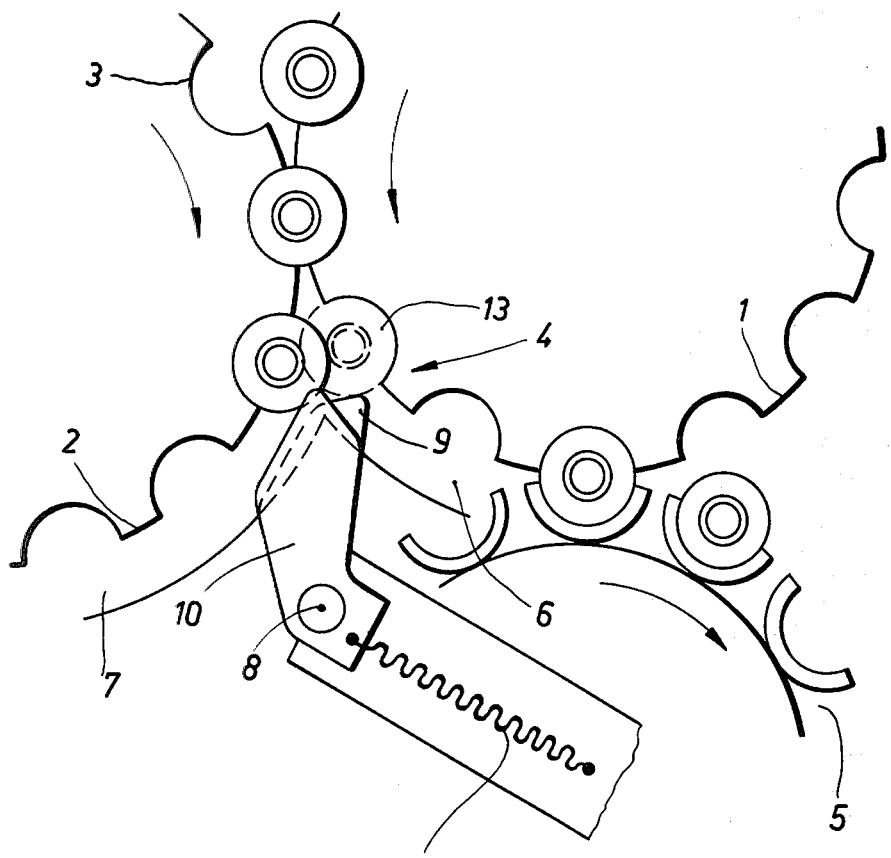
FIG. 1 is a top plan view of the device of the present invention showing a pair of star shaped wheels and a pair of tongue members mounted in the vicinity of the wheels.

In FIG. 1, the conveyor device in accordance with the present invention basically includes two star shaped conveyor wheels 1 and 2, these wheels having circular recesses arranged in their circumferential peripheries. Conveyor wheel 1 is associated, for example, with inspection machinery for checking out bottles for cleanliness. Conveyor wheel 2 serves to convey containers which have passed inspection to another plant location, for example, a liquid filling machine. A further conveyor device 5 is arranged in the vicinity of the conveyor wheels 1 and 2. Conveyor device 5 can be in the form of a conveyor chain with appropriate circular pockets so that containers transferred to a shunt path of movement 6 can be guided on their outer surfaces to be recycled to a cleansing stage by means of further conveyor devices.

Figure 2:
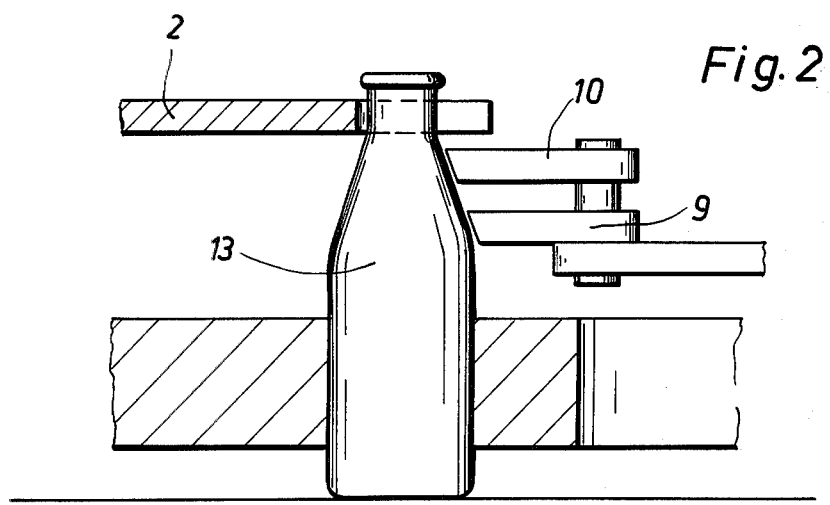
FIG. 2 is a side view of the device of FIG. 1 showing a container confined within one of the conveyor wheels by the tongue members.

In the vicinity of the conveyor wheels 1 and 2, within the range of the shunt path of movement 6 and a main path of movement 7 for the containers, two pivotally mounted tongue members 9,10 are arranged on a common axle bearing 8. Both tongue member 9,10 are urged by means of springs 11,12 toward their idling neutral positions whereat they confront oncoming containers. The upper tongue member 10, which is also shown in FIG. 2, is in the form of a wedge to engage and confine containers or bottles 13 being moved in either the shunt or main paths of movement 6 and 7 in the circular recesses of the conveyor wheels. The other tongue member 9, position below the member 10 on the same axle bearing 8, is arranged to engage and confine containers being moved through the main path of movement 7 to the recesses of conveyor wheel 2. Under normal conditions, i.e., on the transfer of acceptable containers from conveyor wheel 1 to conveyor wheel 2, both tongue members 9,10 serve to guide containers regardless of centrifugal forces developed on the containers by the device. As soon as a defective container is to be removed, it is secured by retainer elements within the wheel 1, these elements being well known, until the container has passed through the region where the wheels 1,2 move tangentially of each other, and has reached the region where the shunt path of movement 6 is tangent to the wheel 1 and the conveyor device 5. In this latter case, tongue member 10 has a surface arranged to engage and confine one of the containers carried along the shunt path 6 to a circular recess. The tongue member 9, arranged below the member 10, has its surface arranged to provide added support for the container to counter centrifugal forces by pressing the container into the recess of the conveyor wheel 1. As the container continues to move in the recess past its initial points of contact with the tongue members, the tongue member 9 pivots about the bearing 8. When there is no further danger that the container will drop from the recess, the tongue member 9 automatically swivels back into its idling or neutral position and the removed defective container can be allowed to continue on its shunt path of movement 6, the retainer elements within the wheel being released.

While specific embodiments of the invention have been shown and described in detail to illustrate the application of the inventive principles, it will be understood that the invention may be embodied otherwise without departing from such principles.

What is claimed is:

1. A device for conveying containers into separate paths comprising at least two conveyor wheels mounted for rotational movement and having circular recesses in their circumferential peripheries for receiving and conveying containers when said wheels are rotated, said wheels being arranged to rotate and having a location at which said wheels are arranged tangentially of each other to define a transfer region wherein a circular recess in the circumferential periphery of each conveyor wheel registers with a corresponding circular recess in the other said conveyor wheel so that a container is held in the registering recesses whereby containers can be conveyed selectively over either a main path of movement downstream from said transfer region on one of said conveyor wheels for containers to be used or a shunt path of movement downstream from said transfer region on the other one of said conveyor wheels for containers to be removed, and a pair of tongue members located downstream of the location of tangency of said wheels in the path of containers leaving the location of tangency and each said tongue member being mounted for individual pivotal movement from a neutral position in the vicinity of said transfer region whereat said tongue members confront said containers, said pair of tongue members being supported separately from said wheels and being spring biased into the neutral position confronting oncoming containers, said tongue members comprising an elongated first tongue member and an elongated second tongue member, each said first and second tongue member having a first end arranged to contact the containers and a second end spaced out of contact with the containers with the elongated direction of said first and second tongues in the neutral position extending tangentially of said conveyor wheels at the location of tangency, the first end of first tongue member being wedge-shaped with the wedge-shaped surfaces conforming generally with the contour of said containers to engage and confine containers moving along either one of said paths to said circular recesses, the first end of said second tongue member being arranged in the neutral position in the path of the containers positioned along one of said main path and shunt path and pivoting out of the neutral position due to the contact with a container and pivoting against the spring biasing action for confining the container within the recess over a certain path of movement of the respective conveyor wheel and when the certain path of movement has been traversed said second tongue member is spring biased back into the neutral position, and a common bearing axle pivotally mounting both of said first and second tongues thereon adjacent the second ends thereof.

* * * * *